(12) United States Patent
Tang et al.

(10) Patent No.: US 8,683,329 B2
(45) Date of Patent: Mar. 25, 2014

(54) WEB TRANSLATION WITH DISPLAY REPLACEMENT

(75) Inventors: Jie Tang, Beijing (CN); Baogang Yao, Beijing (CN); Jeffrey Chin, Sugar Land, TX (US); Zelidrag Hornung, Burlingame, CA (US); Avni Shah, Mountain View, CA (US); Daniel Rosart, Mountain View, CA (US)

(73) Assignee: Google Inc., Mountain View, CA (US)

( * ) Notice: Subject to any disclaimer, the term of this patent is extended or adjusted under 35 U.S.C. 154(b) by 150 days.

(21) Appl. No.: 13/256,415

(22) PCT Filed: Mar. 18, 2009

(86) PCT No.: PCT/CN2009/000291
§ 371 (c)(1),
(2), (4) Date: Sep. 13, 2011

(87) PCT Pub. No.: WO2010/105383
PCT Pub. Date: Sep. 23, 2010

(65) Prior Publication Data
US 2012/0005571 A1    Jan. 5, 2012

(51) Int. Cl.
*G06F 17/00* (2006.01)
(52) U.S. Cl.
USPC ........... 715/265; 715/234; 715/264; 707/761; 707/771; 707/706; 707/708; 707/716
(58) Field of Classification Search
USPC ........................................... 715/234, 26, 265
See application file for complete search history.

(56) References Cited

U.S. PATENT DOCUMENTS

| | | | |
|---|---|---|---|
| 6,119,078 A * | 9/2000 | Kobayakawa et al. | 704/3 |
| 6,347,316 B1 * | 2/2002 | Redpath | 1/1 |
| 6,598,015 B1 * | 7/2003 | Peterson et al. | 704/3 |
| 6,993,471 B1 * | 1/2006 | Flanagan et al. | 704/2 |
| 6,999,916 B2 * | 2/2006 | Lin et al. | 704/8 |

(Continued)

FOREIGN PATENT DOCUMENTS

| | | |
|---|---|---|
| CN | 1295292 | 5/2001 |
| CN | 1719407 | 1/2006 |

(Continued)

OTHER PUBLICATIONS

Office Action mailed Jun. 4, 2013 for co-pending Japanese Patent Application No. 2012-500028, with English translation, 5 pages.

(Continued)

*Primary Examiner* — Cesar Paula
*Assistant Examiner* — Mohammed-Ibrahim Zuberi
(74) *Attorney, Agent, or Firm* — Fish & Richardson P.C.

(57) ABSTRACT

Methods, systems, and apparatus, including computer program products, for translation of markup language documents with display replacement. In some implementations, a method includes displaying a markup language document in an original language by rendering an internal representation of the document, sending a data structure containing the texts from the text nodes of the internal representation, as distinct data entities, to a translation service, replacing the texts with translated texts received from the translation service resulting in a translated representation, and displaying a first translation of the document by rendering the translated representation. In some implementations, partial, incremental translation is performed. In some implementations, a method includes receiving a notification that a phrase in a markup language document has been selected, requesting translation of the text of the selected phrase, and then displaying a received translation in a user interface.

33 Claims, 9 Drawing Sheets

(56) References Cited

U.S. PATENT DOCUMENTS

| | | | |
|---|---|---|---|
| 7,185,289 B1 | 2/2007 | Taima | |
| 7,512,712 B2* | 3/2009 | Kim et al. | 709/246 |
| 7,607,085 B1* | 10/2009 | Lassesen | 715/264 |
| 7,627,479 B2* | 12/2009 | Travieso et al. | 704/277 |
| 7,974,832 B2* | 7/2011 | Furuuchi et al. | 704/7 |
| 7,996,417 B2* | 8/2011 | Travieso et al. | 707/761 |
| 8,312,077 B2* | 11/2012 | Gale et al. | 709/203 |
| 8,332,744 B2* | 12/2012 | Kim et al. | 715/234 |
| 2001/0018649 A1 | 8/2001 | Kasai et al. | |
| 2003/0182453 A1* | 9/2003 | Kim et al. | 709/246 |
| 2004/0010596 A1 | 1/2004 | Hui | |
| 2004/0205671 A1* | 10/2004 | Sukehiro et al. | 715/532 |
| 2006/0075070 A1* | 4/2006 | Merissert-Coffinieres et al. | 709/218 |
| 2007/0143672 A1* | 6/2007 | Lipton et al. | 715/530 |
| 2007/0162847 A1* | 7/2007 | Tunning et al. | 715/533 |
| 2008/0028305 A1* | 1/2008 | Kim et al. | 715/273 |
| 2008/0040094 A1* | 2/2008 | Wolgemuth et al. | 704/2 |
| 2008/0082317 A1* | 4/2008 | Rosart et al. | 704/8 |
| 2008/0114599 A1* | 5/2008 | Slotznick et al. | 704/260 |
| 2008/0172218 A1* | 7/2008 | Suzuki | 704/2 |
| 2008/0281578 A1* | 11/2008 | Kumaran et al. | 704/2 |
| 2009/0157381 A1* | 6/2009 | Furuuchi et al. | 704/7 |
| 2009/0300103 A1* | 12/2009 | Matsutsuka | 709/203 |
| 2010/0286977 A1* | 11/2010 | Chin et al. | 704/4 |
| 2010/0305940 A1* | 12/2010 | Dendi et al. | 704/3 |
| 2012/0005571 A1* | 1/2012 | Tang et al. | 715/234 |

FOREIGN PATENT DOCUMENTS

| | | |
|---|---|---|
| CN | 101470705 | 7/2009 |
| JP | H05-067141 | 3/1993 |
| JP | H08-083280 | 3/1996 |
| JP | 2001/0318918 | 11/2001 |

OTHER PUBLICATIONS

International Search Report and Written Opinion in International Application No. PCT/CN2009/000291, mailed Dec. 31, 2009, 10 pages.

* cited by examiner

```
<html>
    <head>
        <title> Travel Log </title>
    </head>
    <body>
        <p> Places I would like to visit: London, Paris, Rome, and <b> especially</b> Brussels! </p>
        <img id="travel" src="fallbackpicture.jpg">
        <script type="text/javascript">
            document.getElementById("travel").src="airplane.gif";
        </script>
    </body>
</html>
```

WEB TRANSLATION WITH DISPLAY REPLACEMENT

BACKGROUND

This specification relates to translation of markup language documents.

Generally speaking, a markup language document is an electronic document containing text and annotations to the text. The annotations generally include structure information and describe how text should be formatted and displayed to a user. Examples of markup language documents include HyperText Markup Language (HTML) documents, extensible markup language (XML) documents, and Semi-Extensible Markup Language (SEML) documents.

Translation services for markup language documents typically provide a static translation of the document. An identifier of the document (for example, a uniform resource locator (URL)) is sent to the translation service. The translation service retrieves the document, translates the document, and presents a translation of the document as the document appeared when it was retrieved.

SUMMARY

This specification describes technologies relating to translation of markup language documents with display replacement.

These technologies can be realized in the novel embodiments listed at the end of this specification and in the claims.

The listed embodiments and other embodiments of the subject matter described in this specification can be implemented so as to realize one or more of the following advantages. Markup language documents stored on a server can be translated in place on a client. The translation can be dynamic, in that it allows users to interact with scripts on a translated page as the users would with scripts on a non-translated page. Secure files and local (or intranet) files can be translated even when the translation service cannot access the files. Files that are accessible only with a user log-in can be translated even when the translation service cannot access the files. A client machine can translate a markup language document or revert a markup language document to its original language without reloading the document content from a server.

The details of one or more embodiments of the subject matter described in this specification are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figures 1A, 1B:
FIG. 1A-1B illustrate an example markup language document and an example display of the markup language document.

FIG. 1A-1B illustrate an example markup language document 102 and an example display 104 of the markup language document 102.

The markup language document 102 is an HTML document. Annotations are represented as tags in the document. For example, the <html> tag 106 and the </html> tag 108 indicate that the text between the tags is in the HTML language. The <title> tag 110 and the </title> tag 112 indicate that the text between the tags should be formatted as a title. The <b> tag 114 and the </b> tag 116 indicate that the text between the tags should be formatted in bold.

FIG. 1B illustrates a display of the markup language document 102. To display a markup language document, a markup language display program generates an internal representation of the document and renders the document from the internal representation as specified by the annotations. The markup language display program is a computer program that allows a user to display and interact with a markup language document. Examples of such programs are web browsers, e.g., Firefox™, available from the Mozilla Project in Mountain View, Calif. and XML document editors.

Some markup language documents include image annotations, such as the <img> tag 122, indicating that an image should be displayed. Some markup language documents include script tags, such as the <script> and </script> tags 124 and 126 indicating that text between the script tags is a script (i.e., executable program code). When the document is displayed, the script can be executed by the markup language display program. Examples of scripts include action scripts, JavaScript scripts, and AJAX scripts.

Figure 1C:
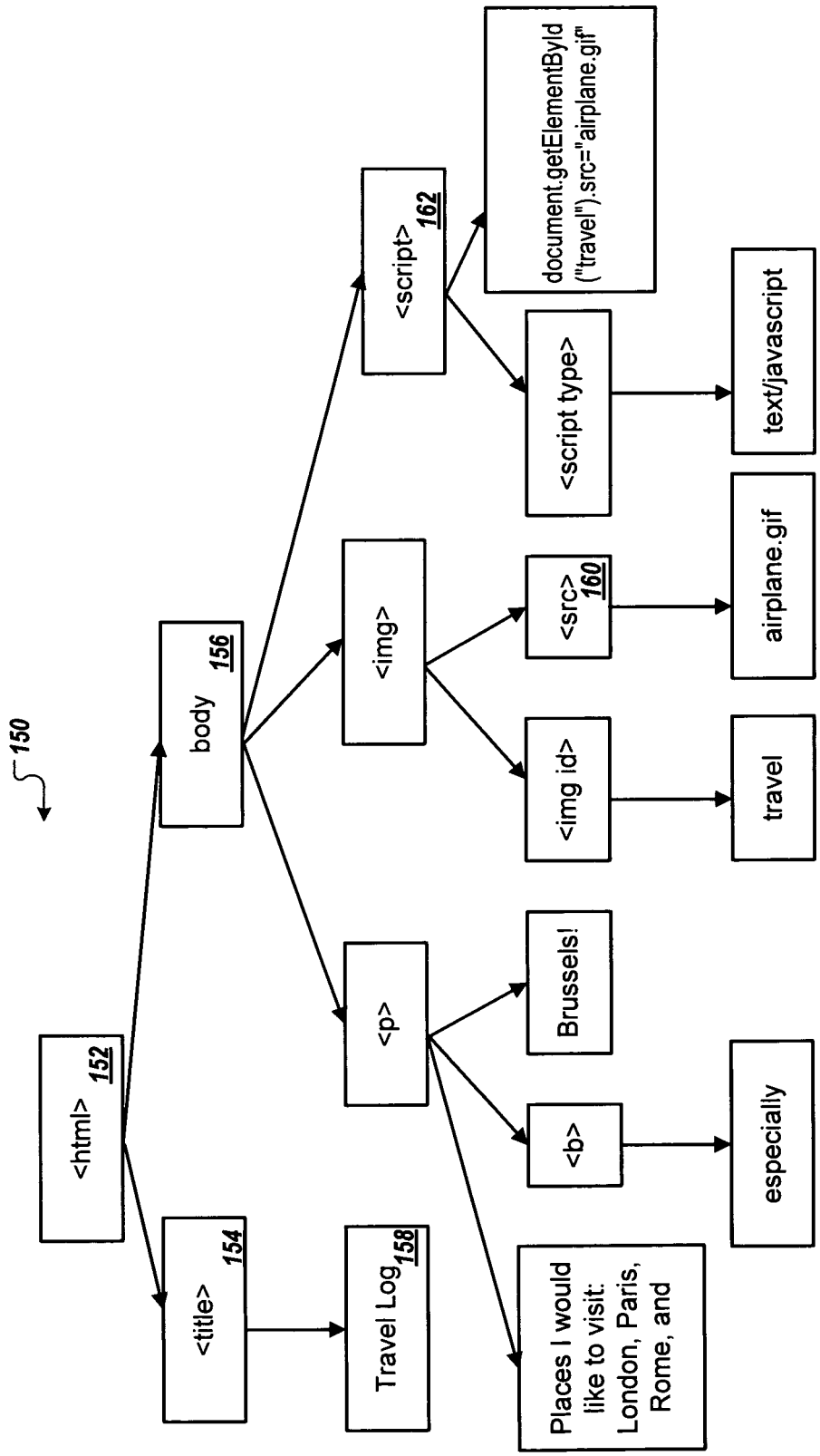
FIG. 1C illustrates an internal document object model (DOM) representation of the markup language document.

FIG. 1C illustrates an internal document object model (DOM) representation 150 of the markup language document 102. The document object model provides an interface that allows executing scripts to access and update the style, structure, and content of the document. Executing scripts can process the document and use the DOM to incorporate the results of the processing into the document.

As shown in FIG. 1C, the DOM represents a document as a tree of node objects. Each node corresponds to a part of the document. Nodes can be various types including, for example, root nodes (e.g., the root node 152), element nodes (e.g., the title element node 154), attribute nodes (e.g., the source attribute node 160), text nodes (e.g., text node 158) and script nodes (e.g., script node 162). A text node is a node corresponding to text in the document, and includes text stored in the node. An element node is a node corresponding to an annotation in the document such as <html> tags or <title> tags. An attribute node is a node corresponding to an attribute of an element node, such as the source for an <image> tag. A script node includes an executable script. A DOM representation can also include other types of nodes.

The structure of the tree is determined by the hierarchical relationships between nodes. The hierarchical relationships of the nodes is due to the nesting of annotations in the document. The hierarchical structure, as well as the order of nodes at the same level of the tree, is processed by a markup language display program and used to present the document.

Figure 2:
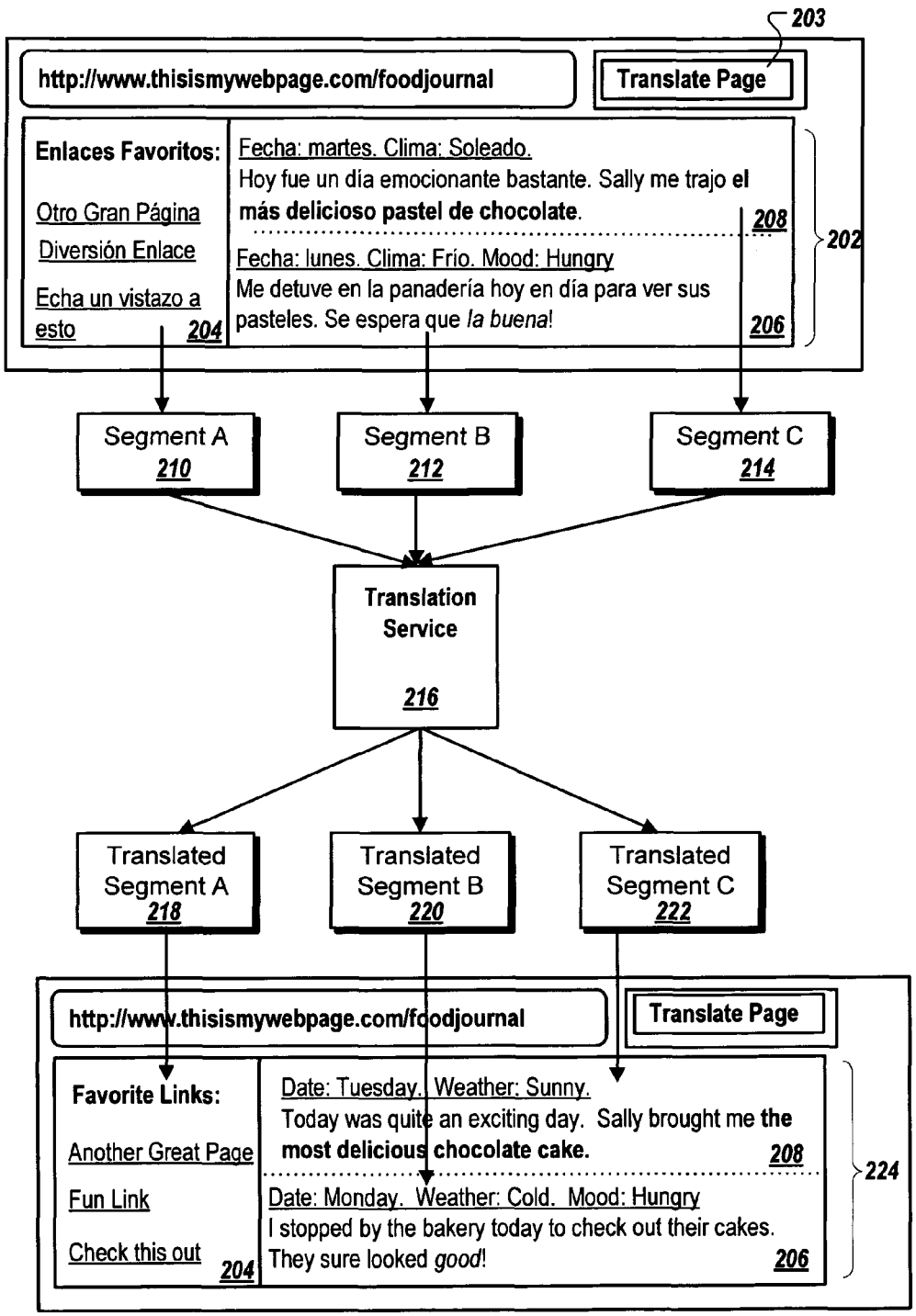
FIG. 2 illustrates an example display of an HTML web page and an example display of a translated version of the web page.

FIG. 2 illustrates an example display of an HTML web page 202 and an example display of a translated version 224 of the web page. The illustrated display is generated by a web browser.

The web browser initially displays the web page in its original form, with its text in the original language of the web page. When translation is initiated, the web browser (or an add-in running in the web browser) extracts segments of text (e.g., Segment A 210, Segment B 212, and Segment C 214) from the internal representation of the document and sends the segments to a translation service 216. The web browser receives translated segments (e.g., Translated Segment A 218, Translated Segment B 220, and Translated Segment C 222) from the translation service and uses the translated segments to update the internal representation of the document 202, resulting in a translated version of the document. For example, the web browser uses Translated Segment A to update the internal representation corresponding to region 204, Translated Segment B 220 to update the internal representation corresponding to region 206, and Translated Segment C 222 to update the internal representation corresponding to region 208. Because the internal representation has been updated, the web browser displays a translated version 224 of the web page.

In some implementations, the web browser performs translation in response to user input requesting the translation. The input can be, for example, a user request such as clicking a "translate page" button 203. In some implementations, the web browser can be configured to translate all web pages that are not in the user's preferred language, or one of the user's preferred languages, or to translate portions of documents that are not in such language or languages.

In some implementations, once a web page is translated, the web browser monitors the web page for changes to its text. Changes can occur, for example, when a script executing in the web browser modifies the text of the web page, or when a user clicks on a link in the web page, causing new or replacement text to be inserted into the web page. When the web browser detects a change in the text of the web page, it identifies the new text and sends the text to the translation service. The web browser uses the resulting translated text to update the internal representation, and then displays an updated web page corresponding to the updated internal representation.

In some implementations, a user can select a phrase in the displayed text and cause the web browser (or an add-in running in the web browser) to present a translation of the selected text. For example, a user can select text with a mouse or other user input device and provide input requesting that the selected text be translated. The input can be, for example, causing the mouse cursor to hover over the selected text or selecting a user interface element to indicate that translation is desired. In response, the web browser causes the selected text to be translated using a translation service. When the web browser receives the translated text from the translation service, the web browser can present the translated text to the user through a tooltip (a box displayed over the selected text) or other graphical user interface element. In some implementations, the displayed text on the web page is translated text, and the user causes the web browser to present the selected text in its original language. The original language text can be stored on the machine running the web browser, or can be retrieved from the translation service.

Figure 3:
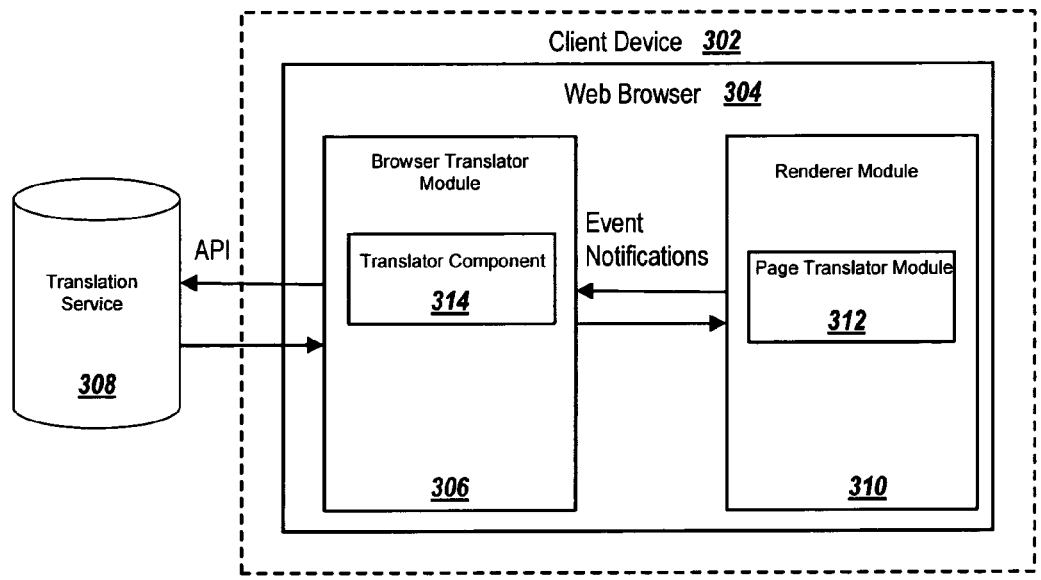
FIG. 3 illustrates an example architecture of a system that provides translations of markup language documents.

FIG. 3 illustrates an example architecture of a system that provides translations of markup language documents.

A client device 302 runs a markup language display program, which in the present example is a web browser 304. The web browser 304 includes a browser translator module 306 and a renderer module 310.

The renderer module 310 presents markup language documents by rendering an internal representation of the document, such as a document object model representation. The renderer module 310 translates a displayed markup language document using a page translator module 312. The page translator module 312 analyzes the internal representation of the current document, extracts text from the text nodes of the representation, and sends the text to the browser translation module 306 for translation. The page translator module 312 receives translated text from the browser translator module 306 and updates the internal representation. The renderer module 310 then renders the updated internal representation. The page translator module 312 and the browser translator module 306 can be configured to interact through event notifications, for example, function callbacks, event sinks, inter-process communication (IPC) messages, or any other convenient form of module-to-module communication.

In some implementations, the web browser 304 maintains two internal representations of the markup language document: an un-translated internal representation corresponding to the document in its original language and a translated internal representation corresponding to a translation of the document. The page translator module 312 updates the translated internal representation and the renderer module 310 presents the translated internal representation. Scripts executed in the web browser modify the un-translated internal representation and in response, the page translator module 312 modifies the translated internal representation.

The translator component 314 receives text corresponding to one or more text nodes in the internal representation from the page translator module 312. The translator component 314 then encodes the text as one or more segments in a form that can be processed by a translation service 308 and sends the text to a translation service 308 for translation. In some implementations of the translation service 308, the translation service provides its clients a translation policy that indicates acceptable segment size and encoding. In some implementations, the segments and their translations are encrypted before being sent to the translation service. The segments can be encrypted using standard encryption protocols, for example, HTTPS, symmetric key cryptography or asymmetric (public/private key) cryptography.

The translator component 314 maintains data mapping each translation request to its corresponding segment. When segments can contain text from multiple nodes, the translator component also maintains data mapping each segment portion to a corresponding text node in the internal document representation. When a translation is received from the translation service, the translator component maps the response to the appropriate text node using the data.

The translation service 308 receives segments from the browser translation module, translates the text of the segments into a different language, and returns the translations of the segments. In some implementations, the translation service is run on a server separate from the client device 302. In alternative implementations, the translation service is run on the client device 302.

In some implementations, each segment is a string of text. Alternatively, each segment (and its translation) can be a data structure that contains the text of the text nodes as separate entities. For example, each segment can include a number of sub-segments, where each sub-segment includes text from a text node and optional metadata about the text. The text sent to the translation service 308 can include in-line markup language tags (e.g., tags occurring within a block of text). As another example, each segment can be the internal representation containing the text nodes (or a portion of the internal representation, or a reduced or redacted version of the internal representation). If the internal representation is too large to send as a single internal representation, the internal representation can be sent to the translation service in multiple segments.

When the translation service receives a segment, it translates the text in the segment and returns a translated segment in the same form as the received segment (e.g., a string of text if the segment was a string of text, or a collection of sub-segments if the segment was a collection of segments). Alternatively, the translation service can return a translated segment in a form such that the translated text can be mapped to the text nodes in the segment (e.g., the translation service can return an "original text"="translated text" pair which can be used to map the translated text back to the original text stored in the text nodes, or when the segment is an internal representation of the document, the translation service can return a collection of sub-segments corresponding to the text of text nodes in the partial internal representation of the document). If the text includes in-line markup language tags, the translation service may translate the text without the tags, and then insert the tags back into the translated text at the appropriate locations. For example, if the text includes multiple sentences, and one sentence is marked with <b> </b> tags, then the translation service may mark the translated sentence with the same tags.

When the translation service receives a segment containing sub-segments, it translates the text of each sub-segment and generates a translated segment containing an entry for each translated sub-segment.

In some implementations, the translation service receives metadata with the segment. The metadata specifies additional information about the segment, for example, the language into which the segment should be translated, the language of the original document (e.g., as detected from HTTP headers in the document), an identification of the text nodes to which the segment corresponds, markup annotations corresponding to the text, or metadata of the document itself (e.g., the document's meta tags).

In some implementations, the translation service may detect information about the segment. For example, the translation service can detect the current language of the segment by comparing the text of the segment to text in different languages and selecting the language that is the closest match. Any detected information can be returned with the translated segment.

Figure 4:
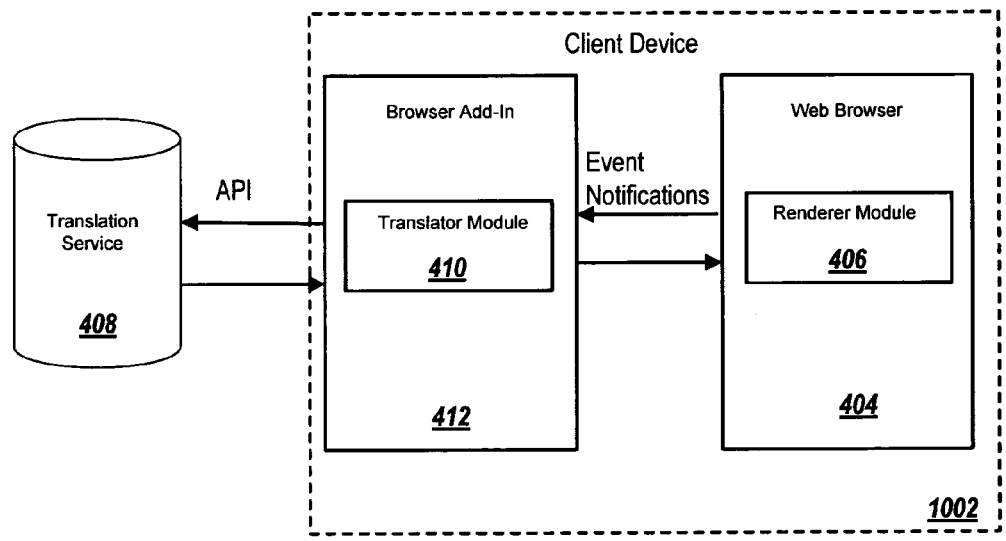
FIG. 4 illustrates an example architecture of a system in which translations of markup language documents are provided through the actions of an add-in component.

FIG. 4 illustrates an example architecture of a system in which translations of markup language documents are provided through the actions of an add-in component. In this example, the system includes a conventional web browser 404 and a browser add-in 412 installed in the web browser, e.g., a toolbar or gadget, that interacts with the DOM and a translation service, and that may also interact with the user.

The add-in 412 includes a translator module 410. The translator module performs the functions of both the page translator module 312 and the browser translator module 406 described above in reference to FIG. 3, except that in conventional systems, the web browser and the add-in only interact with one internal representation of the document.

Figure 5:
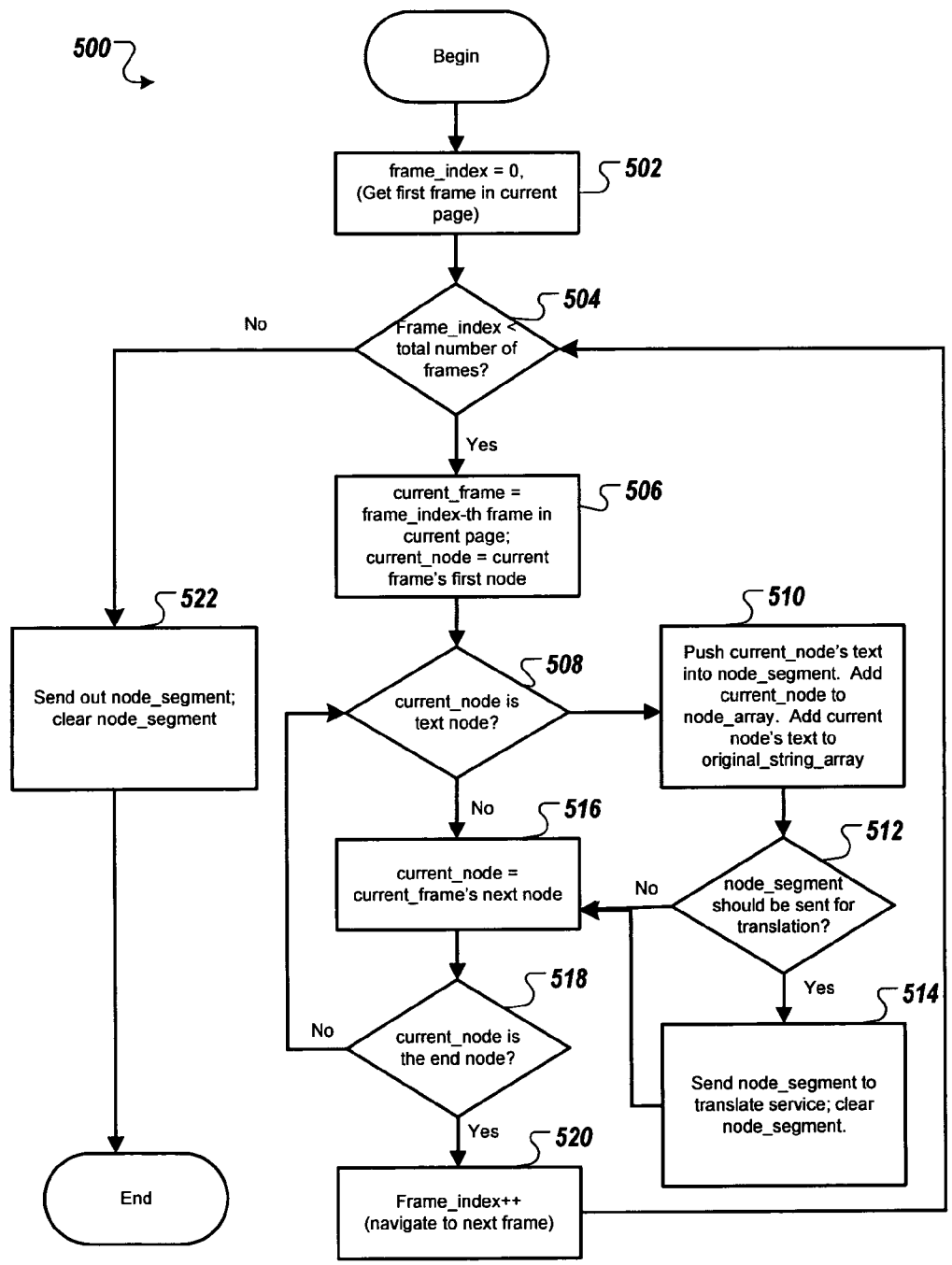
FIG. 5 illustrates an example method for combining the text in text nodes in an internal representation of a document into segments and sending the segments to a translation service to be translated.

FIG. 5 illustrates an example method 500 for combining the text in text nodes in an internal representation of a document into segments and sending the segments to a translation service to be translated. In the present example, the document is an HTML document including multiple frames. The method considers the nodes of each frame in turn, generates segments of text from text nodes, and sends the segments of text to be translated. For convenience, the example method 500 will be described in reference to a system that performs the method 500. The system can be, for example, a computer running a web browser 304 or a web browser 404 with an add-in 412.

The system initializes a frame_index variable to 0 (step 502). Frame_index identifies the current frame, i.e., the frame that is currently being processed.

The system extracts the text from each frame in turn, until all of the frames have been processed. The system then initializes a current_node variable to store a reference (e.g., a pointer) to the first node of the current frame (step 506). The current_node variable points to the current node, i.e., the node that is currently being processed.

The system determines whether or not the current node is a text node (step 508). This can be done, for example, by examining the type of the current node.

If the current node is a text node, the system adds the text in the current node to a node_segment data structure and to an original_string_array data structure. The system also adds a reference to the node itself to a node_array data structure (step 510). The node_array stores references to the text nodes in the document The original_string_array stores the original (not translated) text of the text nodes in the document, and serves as a cache of the original text in each node. The node_segment stores the current segment being built. The segment can be formatted, for example, as specified by a translation policy of a translation service.

The system determines whether the node_segment should be sent to the translation service for translation (step 512). The system can determine whether the node_segment should be sent for translation, for example, based on whether the segment is large enough (i.e., contains enough text, as specified by the translation service or a segment policy of the system), whether the segment is about to become too large (e.g., because the size of the next text node would cause the segment to exceed a maximum size specified by the translation service), or whether the segment represents a coherent piece of the document structure. For example, the system can determine that the node_segment should be sent for translation when the segment has a predetermined number of text nodes, at least a predetermined number of characters, or at least a predetermined number of words. The predefined number can be an absolute number, or an acceptable range. Alternatively, the system can use the structure of the internal representation to determine a segment should be sent for translation when the segment represents a coherent piece of the document structure, for example, by containing an entire paragraph, an entire sentence, or other logical units of the document. For example, a segment corresponding to a paragraph element node can be translated once it contains all of the text nodes that are descendants of the paragraph element.

In some implementations, the system sends a segment for translation as soon as the segment is large enough. If the node_segment should be translated, the text in the node_segment is sent to a translate server and the node_segment data structure is cleared (step 514).

The system then begins to process the next node in the frame. The system updates current_node to point to the next node in the frame (step 516). If the current node is not an end node for the frame, the system determines whether or not the new current node is a text node (steps 518, 508). Otherwise, the system increments frame_index (steps 518, 520) and determines whether frame_index is less than the total number of frames (step 502). If the frame index is greater than or equal to the total number of frames (i.e., when all of the frames have been processed), the system sends text in node_segment to a translation service to be translated, and clears the node_segment data structure (step 522).

Figure 6:
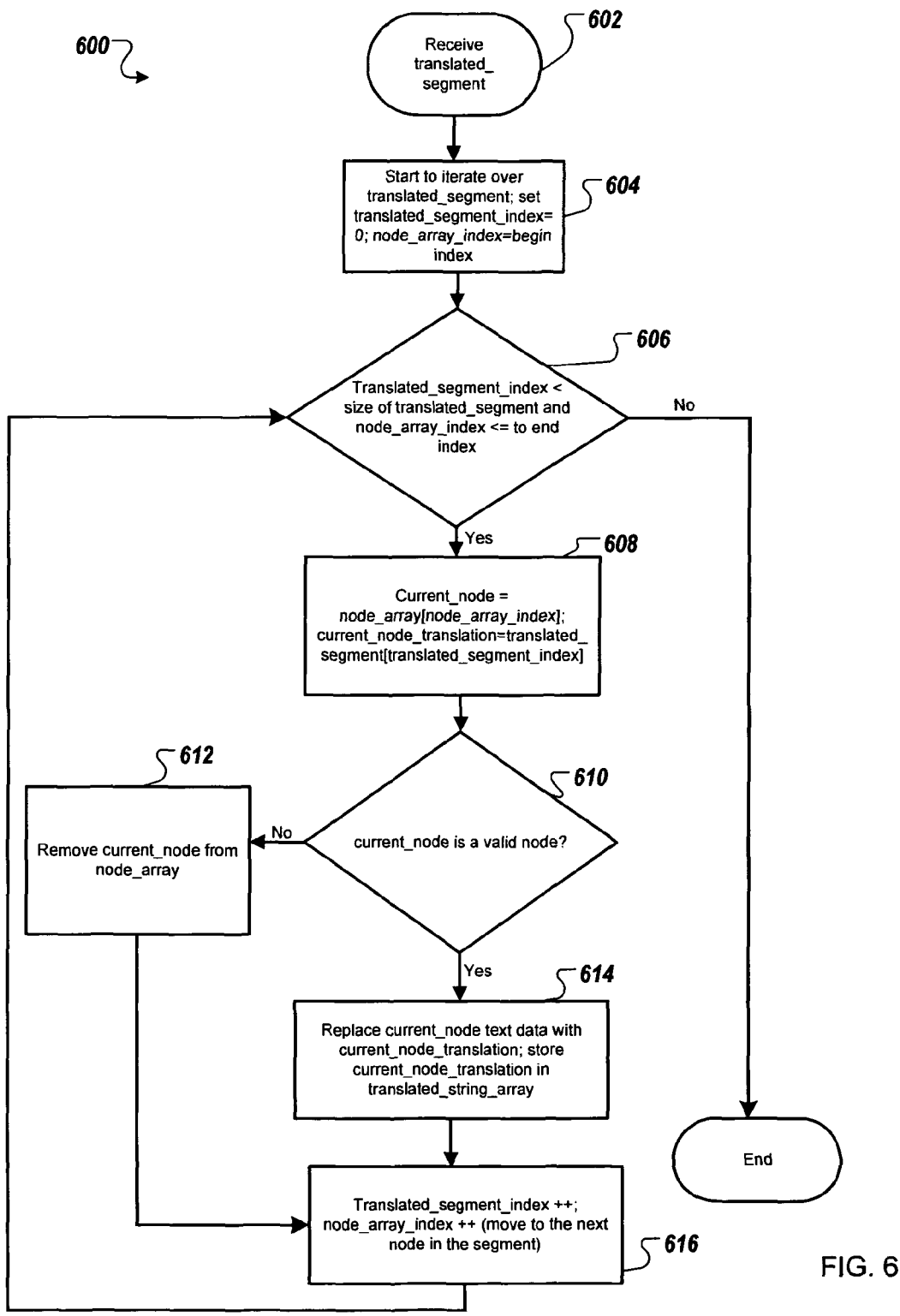
FIG. 6 illustrates an example method for updating an internal representation of a markup language document using a translated segment.

FIG. 6 illustrates an example method 600 for updating an internal representation of a markup language document using a translated segment. The method iterates over the text nodes in the internal representation corresponding to the translated segment and updates the text of the nodes using translated text in the translated segment. For convenience, the example method 600 will be described in reference to a system that performs the method 600. The system can be, for example, a computer running a web browser 304 or a web browser 404 with an add-in 412.

The system receives a translated segment corresponding to a segment of text from the document and stores the translated segment in a translated_segment data structure (step 602). The translated segment is received, for example, from a translation service. The translated segment corresponds to nodes that were added to the node_array (for example, when the system was performing the method described above in reference to FIG. 5) between a begin index and an end index.

The system initializes a translated_segment_index variable to 0 and initializes a node_array_index variable to the begin index for the translated segment (step 604). Translated_segment_index identifies the current sub-segment of the translated segment, i.e., the sub-segment that is currently being processed. Node_array_index identifies the current node in the node array whose text is being updated.

The system sets the current_node variable to point to the current node being updated, i.e., the node identified by the node_array_index, and stores the text in the sub-segment of the translated segment corresponding to the translated_segment_index in a current_node translation data structure (step 608).

The system verifies that the current node is a valid node (step 610). A node is valid if the node has not been removed from the internal document representation and the text of the node has not been changed since the node was added to the node_array. A node can become invalid, for example, when a script executed in the web browser displaying the document removed the node from the internal representation of the document after the system sent the text of the node for translation, when the web browser began loading a new document after the system sent the text of the node for translation, or when the text of the node changed after the system sent the text for translation. Detection of invalid nodes can be dependent on the web browser displaying the document. For example, in some implementations, the system receives a mutation event when a node is removed or modified. In these implementations, the system marks a node as dirty when the system receives a mutation event for the node. A node is valid when it has not been marked.

In some implementations, the system automatically removes an invalid node from the node_array when it receives a mutation event (e.g., a DOM Level 2 Mutation Event) for the node. In some implementations, the system determines whether a node is valid by trying to access the node. If the system is unable to access the node, the node is invalid. If the system is able to access the node, the system compares the text of the node to the text stored in original_string_array for the node. If the texts match, the system determines that the node is valid. Otherwise, the system determines that the node is invalid.

If the current node is not a valid node, the system removes the node from the node_array (step 612). In some implementations, once the system removes the current node from the node array, the system determines whether the node is invalid because it was removed from the document or because it was modified. If the node was modified, the system then determines whether a pointer to the modified node is stored in the node_array. If not, the system translates the text in the modified node by adding the modified node to the node_array, sending the text of the modified node to the translation service for translation, and updating the replacement node with translated text received from the translation service.

If the current node is a valid node, the system replaces the text of the node with the text stored in the current_node_translation, and stores the text in the current_node_translation in the translated_string_array (step 614).

The system then begins to process the next node corresponding to the translated segment by incrementing the translated_segment_index and the node_array_index (step 616).

The system determines if the entire translated segment has been processed by comparing the translated_segment_index to the total number of sub-segments in the translated segment and comparing the node_array_index to the end index for the translated segment (step 606). If the translated_segment_index is greater than or equal to than the total number of elements and the node_array_index is greater than the end index, then the system stops performing the method. Otherwise, the system updates current_node and current_node_translation (step 608).

Figure 7:
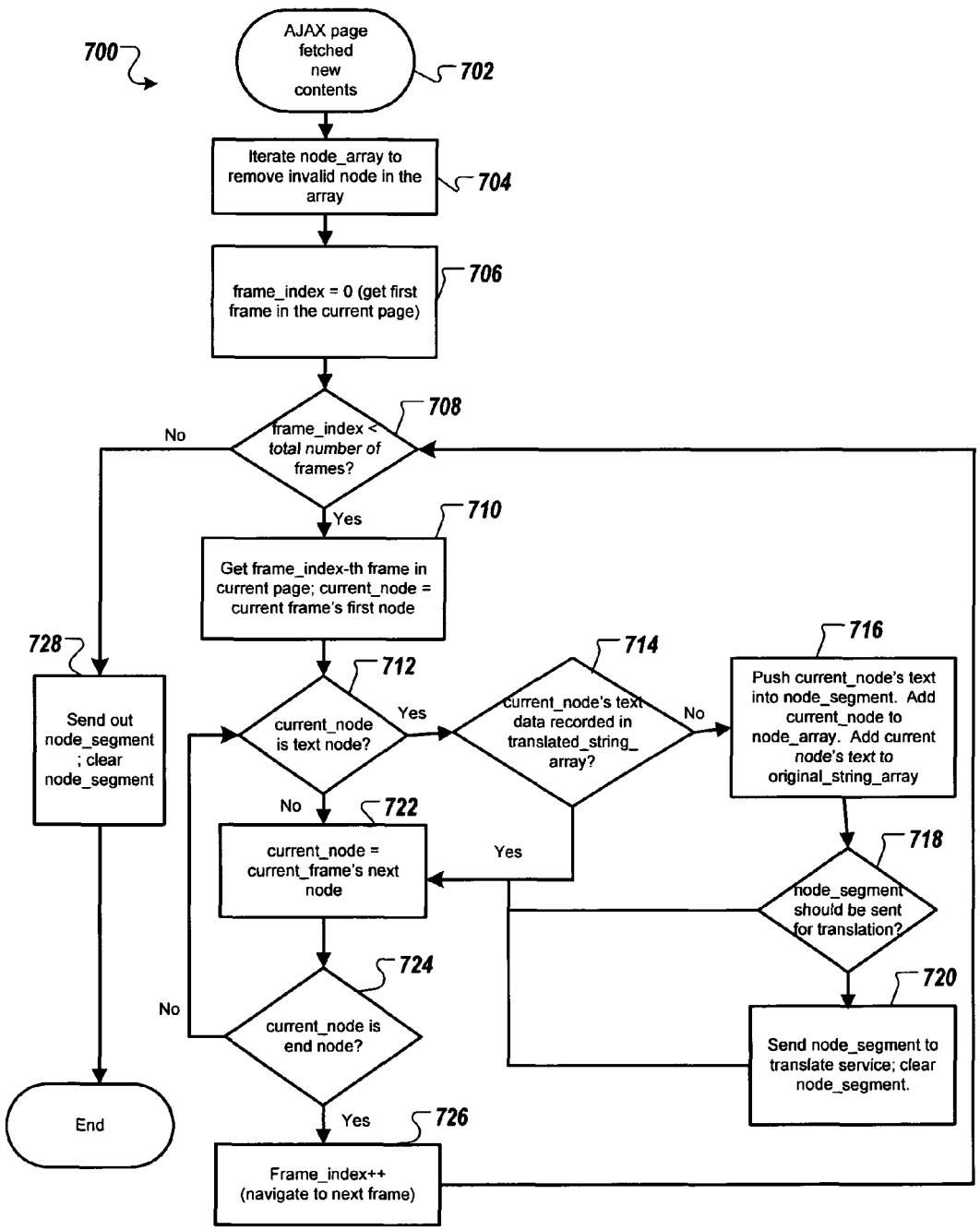
FIG. 7 illustrates an example of method for dynamically translating a portion of a document.

FIG. 7 illustrates an example method 700 for dynamically translating a portion of a document. In the present example, the document is an HTML document including one or more frames. For convenience, the method 700 will be described in reference to a system that performs the method 700. The system can be, for example, a computer running a web browser 304 or a web browser 404 with an add-in 412.

The system receives a notification that the document has been updated (step 702). The document can be updated, for example, when a web browser displaying the document executes a script in the document, and the executing script modifies text content of the document. When the system is a web browser, the notification can be received from a renderer module 310. When the system is a browser add-in 412, the notification can be received from the web browser 404 displaying the document.

The system traverses the node_array to remove any invalid nodes in the array (step 704). The system can determine whether a node is valid, for example, as described above in reference to FIG. 6.

The system initializes frame_index to 0 to identify the first frame in the page (step 706).

The system initializes current_node to point to the first node of the current frame, i.e., the current node being processed (step 710).

The system determines whether or not the current node is a text node (step 712). If the current_node is a text node, the system examines translated_string_array to determine whether the text of the current node is recorded in translated_string_array (step 714).

If the text of the current_node is not recorded in the translated_string_array, the system adds the text in the text node to the node_segment and to the original_string_array (step 716). The system determines whether the node_segment should be sent for translation (step 718). If so, the system sends the text in the node_segment to a translation service and then clears the node_segment data structure (step 720).

The system then begins to process the next node in the frame by updating current_node to point to the next node in the frame (step 722). If the current node is not an end node for the frame, the system determines whether or not the new node is a text node (steps 724, 712). Otherwise, the system increments the frame_index and determines whether frame_index is less than the total number of frames (step 726, 708).

When the frame_index is not less than the total number of frames (i.e., all of the frames have been processed), the system sends the text in the node_segment to a translation service and then clears the node_segment data structure (step 728).

Figure 8:
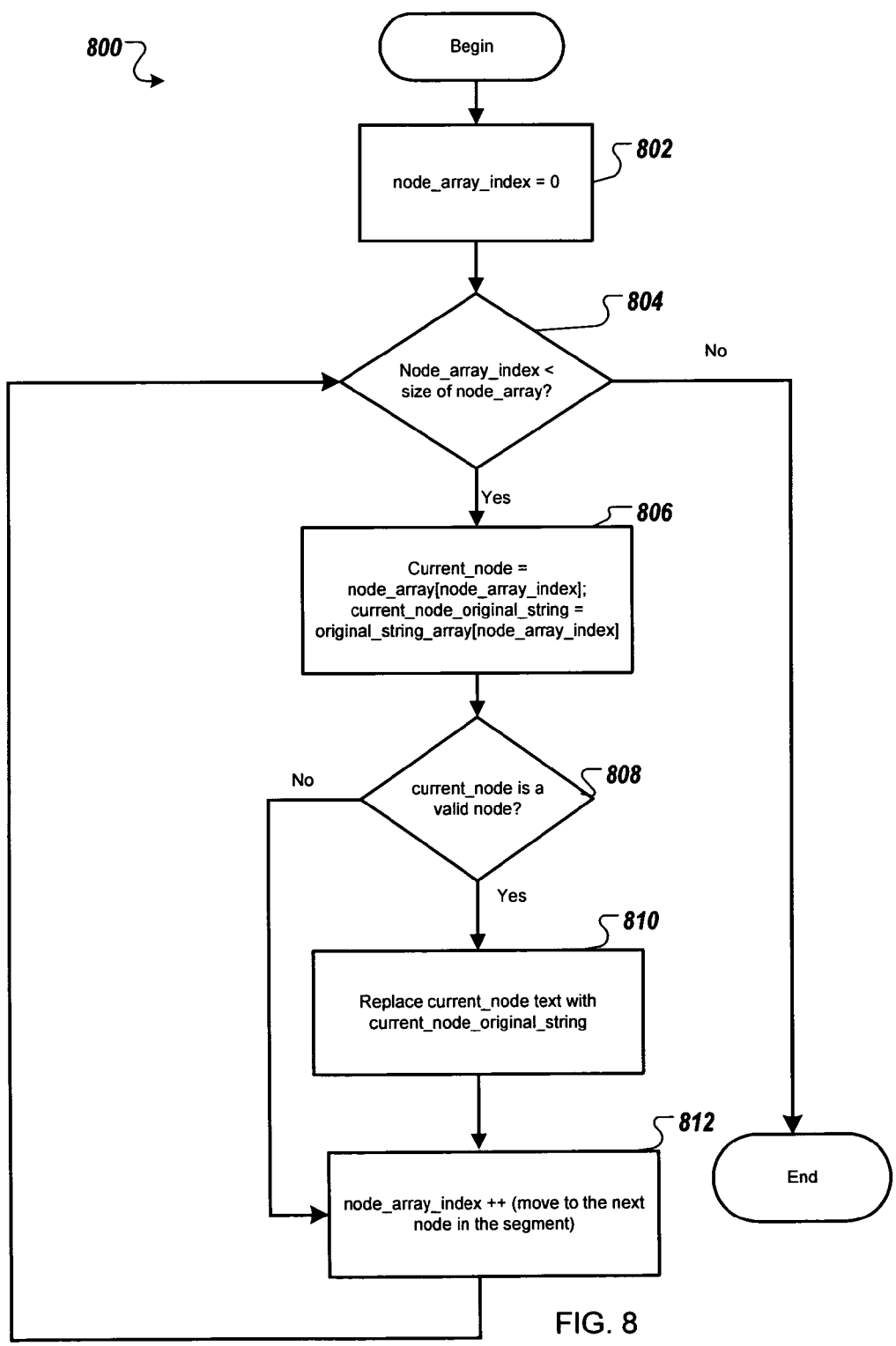
FIG. 8 illustrates an example method for switching from a translated version of a document to an original language version of a document using a cache.

FIG. 8 illustrates an example method 800 for switching from a translated version of a document to an original language version of a document using a cache. The method iterates over each valid node identified by the node_array and replaces the translated text in the node with the original text of the node. For convenience, the example method 800 will be described in reference to a system that performs the method 800. The system can be, for example, a computer running a web browser 304 or a web browser 404 with an add-in 412.

The system initializes node_array_index to 0 (step 802). The system then sets the current_node variable to point to the node stored in the node_array at the node_array_index, and stores the text stored in the original_string_array corresponding to the current node in a current_node_original_string data structure (step 806). The current_node_original_string stores the original text of the current node.

The system determines whether the current node is a valid node (step 808), for example, as described above in reference to FIG. 6. If the current node is a valid node, the system replaces the current text of the current node with the text stored in the current_node_original_string (step 810). If the current node is not a valid node, the system skips the node. In some implementations, the system determines whether there is a modified node and requests translation of the modified node from the translation service as described above in reference to FIG. 6.

The system then increments the node_array_index (step 812) and determines whether the node_array_index is less than the number of nodes in the node_array (step 804).

Figure 9:
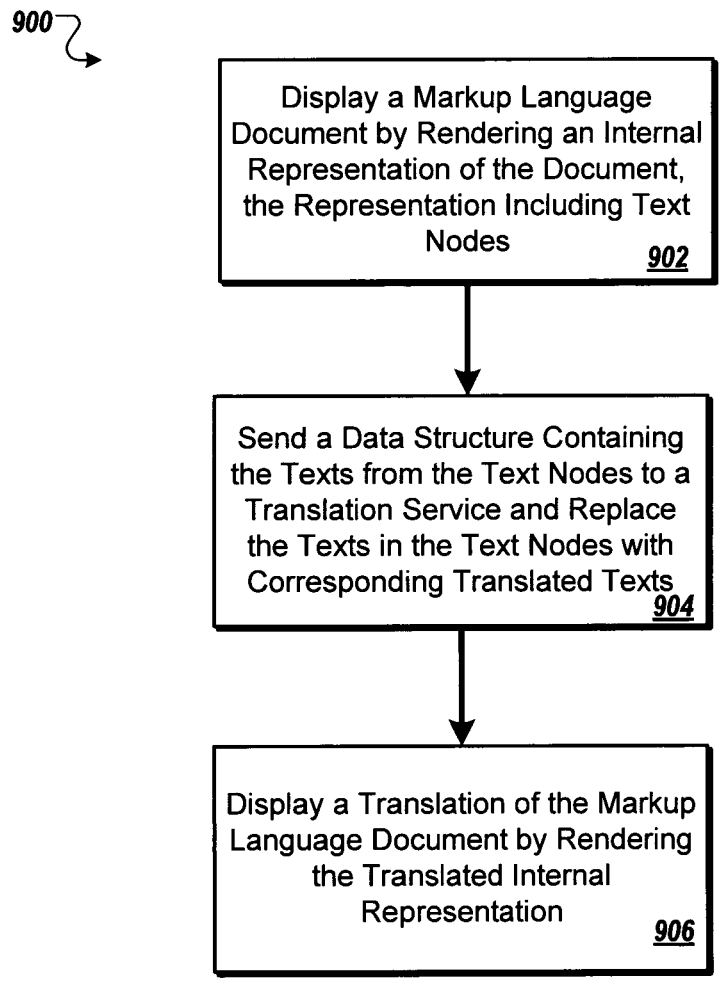
FIG. 9 illustrates an example method for translating the text of a markup language document.

FIG. 9 illustrates an example method 900 for translating the text of a markup language document. For convenience, the example method 900 will be described in reference to a system that performs the method 900. The system can be, for example, a computer running a web browser 304 or a web browser 404 with a browser add-in 412.

The system displays a markup language document (step 902). The markup language document can be, for example, a web document or a document on a user's local computer. Web documents can be retrieved using a secure transfer protocol, for example, using secure hypertext transfer protocol (HTTPS) or using an insecure transfer protocol, for example, hypertext transfer protocol (HTTP).

The system displays a markup language document by rendering an internal representation of the document, for example, a document object model representation as described above in reference to FIG. 1C.

The system sends a data structure containing the texts from the text nodes to a translation service, and the texts in the text nodes are replaced with corresponding translated texts to generate a translated internal representation of the markup language document (step 904). In some implementations, translation is requested as described above in reference to FIG. 5 and the text of the nodes is replaced with translated texts as described above in reference to FIG. 6. In alternative implementations, the text of each node is individually sent to a translation service.

A translation of the markup language document is displayed by rendering the translated internal representation (step 906).

In some implementations, the system incrementally translates the text of the nodes and updates the internal representation. For example, the system can request translation of text corresponding to a subset of the text nodes, update the internal representation with translated texts corresponding to the subset of nodes resulting in a partially translated representation, and then render the partially translated representation. The system can then repeat those steps for a different subset of the text nodes. In some such implementations, the system can perform incremental translation as the markup language document is loaded (e.g., as portions of the internal representation are received).

In some implementations, after the translated version of the document is displayed, the system reverts the document to its original language (for example, in response to user input), and displays the original language version by rendering an original language internal representation of the document. In some implementations, the system generates the original language internal representation from a cache of the original language text of the nodes, for example, as described above in reference to FIG. 8. In alternative implementations, the system maintains the original language internal representation as a shadow copy of the translated internal representation and updates the original language internal representation to reflect any changes to the text of the document.

In some implementations, after the translated version of the document is displayed, the system receives a notification that text in one of the text nodes is being replaced with new text, or that a new node containing new text is being added to the internal representation. The system can receive the notification, for example, as a modification event from an event handler, for example, running in a markup language display program displaying the document. In response to the notification, the system can send a data structure containing the new text to the translation service and replace the text in the text node with translated text received from the translation service. In some implementations, the modification event identifies the node being modified or added, and the system sends the text of that node to the translation service. In alternative implementations, the system traverses the internal representation to identify the node that has been modified or added, for example, as described above in reference to FIG. 7.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The following are exemplary embodiments.

A first embodiment is a method that includes the acts of displaying a markup language document in an original language by rendering an internal representation of the document, the representation including nodes, the nodes including one or more text nodes and one or more non text nodes, the text nodes each including respective original text; and while displaying the document from the internal representation, sending a data structure containing the texts from the text nodes, as distinct data entities, to a translation service and replacing the texts in the text nodes with corresponding translated texts received from the translation service to generate a first translated internal representation of the markup language document, where the original texts in the text nodes are in the original language and the translated texts are in a different second language; whereby a first translation of the markup language document is displayed by rendering the first translated internal representation.

A second embodiment is a method that includes the acts of the first embodiment, wherein sending a data structure containing the texts of the text nodes comprises extracting the texts from the text nodes and assembling the extracted texts into the data structure, where each of the texts is stored as a distinct data entity in the data structure.

A third embodiment is a method that includes the acts of the first embodiment, wherein sending a data structure containing the texts of the text nodes comprises sending a copy of the internal representation.

A fourth embodiment is a method that includes the acts of the first embodiment, wherein sending a data structure containing the texts of the text nodes comprises sending the data structure in multiple segments.

A fifth embodiment is a method that includes the acts of the first embodiment, wherein the internal representation of the document is a document object model representation.

A sixth embodiment is a method that includes the acts of the first embodiment, and further includes the acts of receiving a notification that first text in a first text node is being replaced with new text in the original language; then sending a data structure containing the new text to the translation service and replacing the text in the first text node with a first translated text in the second language received from the translation service to generate a second translated internal representation of the document; whereby a second translation of the markup language document is displayed by rendering the second translated internal representation.

A seventh embodiment is a method that includes the acts of the sixth embodiment, wherein the new text is generated by an executable script executing in the markup language display program.

An eighth embodiment is a method that includes the acts of the first embodiment, and further includes the acts of verifying that each original text is unchanged before replacing the original text with the corresponding translated text.

A ninth embodiment is a method that includes the acts of the first embodiment, and further includes the acts of storing the original text corresponding to one or more text nodes; receiving input requesting display of the document in the original language; and replacing the texts in the text nodes in the first translated internal representation with the corresponding original texts, resulting in an original language internal representation; whereby a translation of the markup language document is displayed by rendering the first translated internal representation.

A tenth embodiment is a method that includes the acts of displaying a document in an original language by rendering an internal representation of the document, the representation including nodes, the nodes including one or more text nodes and one or more non text nodes, the text nodes each including respective original text; then selecting a first text node in the internal representation, sending a data structure containing first text in the first text node to a translation service, and replacing the first text in the first text node with a corresponding first translated text received from the translation service to generate a first partially translated internal representation of the document, where the first text is in the original language and the first translated text is in a different second language; whereby a first partial translation of the markup language document is displayed by rendering the first partially translated internal representation; and then selecting a second text node in the first partially translated internal representation, sending a data structure containing second text in the second text node, as a distinct data entity, to a translation service, and replacing the second text in the second text node with a corresponding second translated text received from the translation service to generate a second partially translated internal representation of the document, where the second text is in the original language and the second translated text is in the second language; whereby a second partial translation of the markup language document is displayed by rendering the second partially translated internal representation.

An eleventh embodiment is a method that includes the acts of the tenth embodiment, wherein sending a data structure containing the texts of the text nodes comprises extracting the texts from the text nodes and assembling the extracted texts into the data structure, where each of the texts is stored as a distinct data entity in the data structure.

A twelfth embodiment is a method that includes the acts of the tenth embodiment, wherein sending a data structure containing the texts of the text nodes comprises sending a copy of the internal representation.

A thirteenth embodiment is a method that includes the acts of the tenth embodiment, wherein sending a data structure containing the texts of the text nodes comprises sending the data structure in multiple segments.

A fourteenth embodiment is a method that includes the acts of the tenth embodiment, wherein the internal representation of the document is a document object model representation.

A fifteenth embodiment is a method that includes the acts of the tenth embodiment, further including the acts of receiving a notification that third text in a third text node is being replaced with new text in the original language; then sending a data structure containing the new text to the translation service, and replacing the text in the third text node with a corresponding third translated text in the second language received from the translation service to generate a third partially translated internal representation of the document whereby a third partial translation of the markup language document is displayed by rendering the third partially translated internal representation.

A sixteenth embodiment is a method that includes the acts of the fifteenth embodiment, wherein the new text is generated by an executable script executing in the markup language display program.

A seventeenth embodiment is a method that includes the acts of the tenth embodiment, and further includes the acts of verifying that each text in a text node is unchanged before replacing the text with the corresponding translated text.

An eighteenth embodiment is a method that includes the acts of the tenth embodiment, and further includes the acts of storing the original text corresponding to one or more text nodes; receiving input requesting display of the document in the original language; and replacing the texts in the text nodes in the first translated internal representation with the corresponding original texts, resulting in an original language internal representation; whereby a translation of the markup language document is displayed by rendering the first translated internal representation.

A nineteenth embodiment is a method that includes the acts of providing a translation service that receives text and generates a translation of the text; providing a translation module configured to run in a markup language display program, the markup language display program displaying a markup language document in an original language by rendering an internal representation of the document, the representation including nodes, the nodes including one or more text nodes and one or more non text nodes, the text nodes each including respective original text, the translation module configured to perform the following operations: while the markup language display program displays the document from the internal representation, sending a data structure containing the texts from the text nodes, as distinct data entities, to a translation service; replacing the texts in the text nodes with corresponding translated texts received from the translation service to generate a first translated internal representation of the markup language document, where the original texts in the text nodes are in the original language and the translated texts are in a different second language, and providing the first translated internal representation to the markup language display program for rendering.

A twentieth embodiment is a method that includes the acts of the nineteenth embodiment, wherein sending a data structure containing the texts of the text nodes comprises extracting the texts from the text nodes and assembling the extracted texts into the data structure, where each of the texts is stored as a distinct data entity in the data structure.

A twenty first embodiment is a method that includes the acts of the nineteenth embodiment, wherein sending a data structure containing the texts of the text nodes to comprises sending a copy of the internal representation.

A twenty second embodiment is a method that includes the acts of the nineteenth embodiment, wherein sending a data structure containing the texts of the text nodes comprises sending the data structure in multiple segments.

A twenty third embodiment is a method that includes the acts of the nineteenth embodiment, wherein the internal representation of the document is a document object model representation.

A twenty fourth embodiment is a method that includes the acts of the nineteenth embodiment, wherein the translation module is further configured to perform the following operations: receiving a notification that first text in a first text node is being replaced with new text in the original language; then sending a data structure containing the new text to the translation service, and replacing the text in the first text node with a first translated text in the second language received from the translation service to generate a second translated internal representation of the document; and then providing the second translated internal representation to the markup language display program for rendering.

A twenty fifth embodiment is a method that includes the acts of the twenty fourth embodiment, wherein the new text is generated by an executable script executing in the markup language display program.

A twenty sixth embodiment is a method that includes the acts of the nineteenth embodiment, and further includes the acts of verifying that each original text is unchanged before replacing the original text with the corresponding translated text.

A twenty seventh embodiment is a method that includes the acts of the nineteenth embodiment, and further includes the acts of storing the original text corresponding to one or more text nodes; receiving input requesting display of the document in the original language; and replacing the texts in the text nodes in the first translated internal representation with the corresponding original texts, resulting in an original language internal representation; whereby a translation of the markup language document is displayed by rendering the first translated internal representation.

A twenty eight embodiment is a method including the acts of receiving a notification that a phrase comprising multiple words in a markup language document displayed in a user interface on a client device has been selected; requesting a translation of text corresponding to the selected phrase from a translation service on a server; and receiving a translation from the translation service and then displaying the translation in the user interface.

A twenty ninth embodiment is a method that includes the acts of the twenty eighth embodiment, wherein the translation is displayed in a tooltip.

A thirtieth embodiment is a method that includes the acts of storing original text corresponding to translated text in a translated markup language document, where the original text is in an original language and the translated text is in a different second language; displaying the translated markup language document in a user interface; receiving a notification that a phrase comprising multiple words in the translated text has been selected; and in response to the notification, displaying the original text corresponding to the selected phrase.

A thirty first embodiment is a method that includes the acts of the thirtieth embodiment, wherein the original text corresponding to the selected phrase is displayed in a tooltip.

A thirty second embodiment is a system, comprising: one or more computers operable to perform operations comprising: displaying a markup language document in an original language by rendering an internal representation of the document, the representation including nodes, the nodes including one or more text nodes and one or more non text nodes, the text nodes each including respective original text; and while displaying the document from the internal representation, sending a data structure containing the texts from the text nodes, as distinct data entities, to a translation service and replacing the texts in the text nodes with corresponding translated texts received from the translation service to generate a first translated internal representation of the markup language document, where the original texts in the text nodes are in the original language and the translated texts are in a different second language; whereby a first translation of the markup language document is displayed by rendering the first translated internal representation.

A thirty third embodiment is the system of the thirty second embodiment further comprising a server device providing the translation service.

A thirty fourth embodiment is the system of the thirty second embodiment, wherein the system comprises a client device running a markup language display program operable to perform the displaying a markup language document operation, and an add in running in the markup language display program operable to perform the sending the data structure and replacing the texts in the text nodes operations.

A thirty fifth embodiment is the system of the thirty fourth embodiment, wherein the add in is a gadget.

A thirty sixth embodiment is the system of the thirty fourth embodiment, wherein the add in is a toolbar.

A thirty seventh embodiment is the system of the thirty second embodiment, wherein the system comprises a client device running a web browser operable to perform the displaying a markup language document, sending the data structure, and replacing the texts in the text nodes operations.

A thirty eighth embodiment is the system of the thirty second embodiment, wherein sending a data structure containing the texts of the text nodes comprises extracting the texts from the text nodes and assembling the extracted texts into the data structure, where each of the texts is stored as a distinct data entity in the data structure.

A thirty ninth embodiment is the system of the thirty second embodiment, wherein sending a data structure containing the texts of the text nodes comprises sending a copy of the internal representation.

A fortieth embodiment is the system of the thirty second embodiment, wherein sending a data structure containing the texts of the text nodes comprises sending the data structure in multiple segments.

A forty first embodiment is the system of the thirty second embodiment, wherein the internal representation of the document is a document object model representation.

A forty second embodiment is the system of the thirty second embodiment, further operable to perform operations comprising: receiving a notification that first text in a first text node is being replaced with new text in the original language; then sending a data structure containing the new text to the translation service and replacing the text in the first text node with a first translated text in the second language received from the translation service to generate a second translated internal representation of the document; whereby a second translation of the markup language document is displayed by rendering the second translated internal representation.

A forty third embodiment is the system of the forty second embodiment, wherein the new text is generated by an executable script executing in the markup language display program.

A forty fourth embodiment is the system of the thirty second embodiment, further operable to perform operations comprising verifying that each original text is unchanged before replacing the original text with the corresponding translated text.

A forty fifth embodiment is the system of the thirty second embodiment, further operable to perform operations comprising: storing the original text corresponding to one or more text nodes; receiving input requesting display of the document in the original language; and replacing the texts in the text nodes in the first translated internal representation with the corresponding original texts, resulting in an original language internal representation; whereby a translation of the markup language document is displayed by rendering the first translated internal representation.

A forty sixth embodiment is a system, comprising: one or more computers operable to perform operations comprising: displaying a document in an original language by rendering an internal representation of the document, the representation including nodes, the nodes including one or more text nodes and one or more non text nodes, the text nodes each including respective original text; then selecting a first text node in the representation, sending a data structure containing first text in the first text node to a translation service, and replacing the first text in the first text node with a corresponding first translated text received from the translation service to generate a first partially translated internal representation of the document, where the first text is in the original language and the first translated text is in a different second language; whereby a first partial translation of the markup language document is displayed by rendering the first partially translated internal representation; and then selecting a second text node in the first partially translated internal representation, sending a data structure containing second text in the second text node to a translation service, and replacing the second text in the second text node with a corresponding second translated text received from the translation service to generate a second partially translated internal representation of the document, where the second text is in the original language and the second translated text is in the second language; whereby a second partial translation of the markup language document is displayed by rendering the second partially translated internal representation.

A forty seventh embodiment is the system of the forty sixth embodiment, further comprising a server device providing the translation service.

A forty eighth embodiment is the system of the forty sixth embodiment, wherein the system comprises a client device running a markup language display program operable to perform the displaying a markup language document operation, and an add in running in the markup language display program operable to perform the sending a data structure and replacing the texts in the text nodes operations.

A forty ninth embodiment is the system of the forty sixth embodiment, wherein the add in is a gadget.

A fiftieth embodiment is the system of the forty sixth embodiment, wherein the add in is a toolbar.

A fifty first embodiment is the system of the forty sixth embodiment, wherein the system comprises a client device running a web browser operable to perform the displaying a markup language document, sending the data structure and replacing the texts in the text nodes operations.

A fifty second embodiment is the system of the forty sixth embodiment, wherein sending a data structure containing the texts of the text nodes comprises extracting the texts from the text nodes and assembling the extracted texts into the data structure, where each of the texts is stored as a distinct data entity in the data structure.

A fifty third embodiment is the system of the forty sixth embodiment, wherein sending a data structure containing the texts of the text nodes comprises sending a copy of the internal representation.

A fifty fourth embodiment is the system of the forty sixth embodiment, wherein sending a data structure containing the texts of the text nodes comprises sending the data structure in multiple segments.

A fifty fifth embodiment is the system of the forty sixth embodiment, wherein the internal representation of the document is a document object model representation.

A fifty sixth embodiment is the system of the forty sixth embodiment, further operable to perform operations comprising: receiving a notification that third text in a third text node is being replaced with new text in the original language; then sending a data structure containing the new text to the translation service, and replacing the text in the third text node with a corresponding third translated text in the second language received from the translation service to generate a third partially translated internal representation of the document; whereby a third partial translation of the markup language document is displayed by rendering the third partially translated internal representation.

A fifty seventh embodiment is the system of the fifty sixth embodiment, wherein the new text is generated by an executable script executing in the markup language display program.

A fifty eighth embodiment is the system of the forty sixth embodiment, further operable to perform operations comprising verifying that each text in a text node is unchanged before replacing the text with the corresponding translated text.

A fifty ninth embodiment is the system of the forty sixth embodiment, further operable to perform operations comprising: storing the original text corresponding to one or more text nodes; receiving input requesting display of the document in the original language; and replacing the texts in the text nodes in the first translated internal representation with the corresponding original texts, resulting in an original language internal representation; whereby a translation of the markup language document is displayed by rendering the first translated internal representation.

A sixtieth embodiment is a system comprising: one or more computers operable to perform operations comprising: providing a translation service that receives text and generates a translation of the text; providing a translation module configured to run in a markup language display program, the markup language display program displaying a markup language document in an original language by rendering an internal representation of the document, the representation including nodes, the nodes including one or more text nodes and one or more non text nodes, the text nodes each including respective original text, the translation module configured to perform the following operations: while the markup language display program displays the document from the internal representation, sending a data structure containing the texts from the text nodes, as distinct data entities, to a translation service; replacing the texts in the text nodes with corresponding translated texts received from the translation service to generate a first translated internal representation of the markup language document, where the original texts in the text nodes are in the original language and the translated texts are in a different second language; and providing the first translated internal representation to the markup language display program for rendering.

A sixty first embodiment is the system of the sixtieth embodiment, wherein the system comprises a server running a translation service.

A sixty second embodiment is the system of the sixtieth embodiment, wherein the translation module is associated with an add in running in the markup language display program.

A sixty third embodiment is the system of the sixty second embodiment, wherein the add in is a gadget.

A sixty fourth embodiment is the system of the sixty second embodiment, wherein the add in is a toolbar.

A sixty fifth embodiment is the system of the sixtieth embodiment, wherein the translation module and the markup language display program are a web browser.

A sixty sixth embodiment is the system of the sixtieth embodiment, wherein sending a data structure containing the texts of the text nodes comprises extracting the texts from the text nodes and assembling the extracted texts into the data structure, where each of the texts is stored as a distinct data entity in the data structure.

A sixty seventh embodiment is the system of the sixtieth embodiment, wherein sending a data structure containing the texts of the text nodes comprises sending a copy of the internal representation.

A sixty eighth embodiment is the system of the sixtieth embodiment, wherein sending a data structure containing the texts of the text nodes comprises sending the data structure in multiple segments.

A sixty-ninth embodiment is the system of the sixtieth embodiment, wherein the internal representation of the document is a document object model representation.

A seventieth embodiment is the system of the sixtieth embodiment, wherein the translation module is further configured to perform the following operations: receiving a notification that first text in a first text node is being replaced with new text in the original language; then sending a data structure containing the new text to the translation service, and replacing the text in the first text node with a first translated text in the second language received from the translation service to generate a second translated internal representation of the document; and then providing the second translated internal representation to the markup language display program for rendering.

A seventy first embodiment is the system of the seventieth embodiment, wherein the new text is generated by an executable script executing in the markup language display program.

A seventy second embodiment is the system of the sixtieth embodiment, further operable to perform operations comprising verifying that each original text is unchanged before replacing the original text with the corresponding translated text.

A seventy third embodiment is the system of the sixtieth embodiment, further operable to perform operations comprising: storing the original text corresponding to one or more text nodes; receiving input requesting display of the document in the original language; and replacing the texts in the text nodes in the first translated internal representation with the corresponding original texts, resulting in an original language internal representation; whereby a translation of the markup language document is displayed by rendering the first translated internal representation.

A seventy fourth embodiment is a system comprising: one or more computers operable to perform operations comprising: receiving a notification that a phrase comprising multiple words in a markup language document displayed in a user interface on a client device has been selected; requesting a translation of text corresponding to the selected phrase from a translation service on a server; and receiving a translation from the translation service and then displaying the translation in the user interface.

A seventy fifth embodiment is the system of the seventy-fourth embodiment, wherein the system comprises a client device running an add in operable to perform the receiving a notification, requesting a translation of text, and receiving a translation from the translation service operations.

A seventy sixth embodiment is the system of the seventy-fifth embodiment, wherein the add in is a gadget.

A seventy seventh embodiment is the system of the seventy-fifth embodiment, wherein the add in is a toolbar.

A seventy eighth embodiment is the system of the seventy-fourth embodiment, wherein the system comprises a client device running a web browser operable to perform the receiving a notification, requesting a translation of text, and receiving a translation from the translation service operations.

A seventy ninth embodiment is the system of the seventy-fourth embodiment, wherein the translation is displayed in a tooltip.

An eightieth embodiment is a system comprising: one or more computers operable to perform operations comprising: storing original text corresponding to translated text in a translated markup language document, where the original text is in an original language and the translated text is in a different second language; displaying the translated markup language document in a user interface; receiving a notification that a phrase comprising multiple words in the translated text has been selected; and in response to the notification, displaying the original text corresponding to the selected phrase.

An eighty-first embodiment is the system of the eightieth embodiment, wherein the system comprises a client device running an add in operable to perform the storing original text, displaying the translated markup language document, receiving a notification, and displaying the original text operations.

An eighty second embodiment is the system of the eighty second embodiment, wherein the add in is a gadget.

An eighty third embodiment is the system of the eighty second embodiment, wherein the add in is a toolbar.

An eighty fourth embodiment is the system of the eightieth embodiment, wherein the system comprises a client device running a web browser operable to perform the storing original text, displaying the translated markup language document, receiving a notification, and displaying the original text operations.

An eighty fifth embodiment is the system of the eightieth embodiment, wherein the original text corresponding to the selected phrase is displayed in a tooltip.

An eighty sixth embodiment is a computer program product encoded on computer storage medium comprising instructions that when executed by a data processing apparatus cause the data processing apparatus to perform operations comprising: displaying a markup language document in an original language by rendering an internal representation of the document, the representation including nodes, the nodes including one or more text nodes and one or more non text nodes, the text nodes each including respective original text; and while displaying the document from the internal representation, sending a data structure containing the texts from the text nodes, as distinct data entities, to a translation service and replacing the texts in the text nodes with corresponding translated texts received from the translation service to generate a first translated internal representation of the markup language document, where the original texts in the text nodes are in the original language and the translated texts are in a different second language; whereby a first translation of the markup language document is displayed by rendering the first translated internal representation.

An eighty seventh embodiment is the computer program product of the eighty sixth embodiment, wherein sending a data structure containing the texts of the text nodes comprises extracting the texts from the text nodes and assembling the extracted texts into the data structure, where each of the texts is stored as a distinct data entity in the data structure.

An eighty eighth embodiment is the computer program product of the eighty sixth embodiment, wherein sending a data structure containing the texts of the text nodes comprises sending a copy of the internal representation.

An eighty ninth embodiment is the computer program product of the eighty sixth embodiment, wherein sending a data structure containing the texts of the text nodes comprises sending the data structure in multiple segments.

A ninetieth embodiment is the computer program product of the eighty sixth embodiment, wherein the internal representation of the document is a document object model representation.

A ninety-first embodiment is the computer program product of the eighty sixth embodiment, further operable to cause the data processing apparatus to perform operations comprising: receiving a notification that first text in a first text node is being replaced with new text in the original language; then sending a data structure containing the new text to the translation service and replacing the text in the first text node with a first translated text in the second language received from the translation service to generate a second translated internal representation of the document; whereby a second translation of the markup language document is displayed by rendering the second translated internal representation.

A ninety-second embodiment is the computer program product of the ninety first embodiment, wherein the new text is from an executable script executing in the markup language display program.

A ninety-third embodiment is the computer program product of the eighty sixth embodiment, further operable to cause the data processing apparatus to perform operations comprising verifying that each original text is unchanged before replacing the original text with the corresponding translated text.

A ninety-fourth embodiment is the computer program product of the eighty sixth embodiment, further operable to cause the data processing apparatus to perform operations comprising: storing the original text corresponding to one or more text nodes; receiving input requesting display of the document in the original language; and replacing the texts in the text nodes in the first translated internal representation with the corresponding original texts, resulting in an original language internal representation; whereby a translation of the markup language document is displayed by rendering the first translated internal representation.

A ninety-fifth embodiment is a computer program product encoded on computer storage medium comprising instructions that when executed by a data processing apparatus cause the data processing apparatus to perform operations comprising: displaying a document in an original language by rendering an internal representation of the document, the representation including nodes, the nodes including one or more text nodes and one or more non text nodes, the text nodes each including respective original text; then selecting a first text node in the internal representation, sending a data structure containing first text in the first text node to a translation service, and replacing the first text in the first text node with a corresponding first translated text received from the translation service to generate a first partially translated internal representation of the document, where the first text is in the original language and the first translated text is in a different second language; whereby a first partial translation of the markup language document is displayed by rendering the first partially translated internal representation; and then selecting a second text node in the first partially translated internal representation, sending a data structure containing second text in the second text node, as a distinct data entity, to a translation service, and replacing the second text in the second text node with a corresponding second translated text received from the translation service to generate a second partially translated internal representation of the document, where the second text is in the original language and the second translated text is in the second language; whereby a second partial translation of the markup language document is displayed by rendering the second partially translated internal representation.

A ninety-sixth embodiment is the computer program product of the ninety fifth embodiment, wherein sending a data structure containing the texts of the text nodes comprises extracting the texts from the text nodes and assembling the extracted texts into the data structure, where each of the texts is stored as a distinct data entity in the data structure.

A ninety-seventh embodiment is the computer program product of the ninety fifth embodiment wherein sending a data structure containing the texts of the text nodes comprises sending a copy of the internal representation.

A ninety-eighth embodiment is the computer program product of the ninety seventh embodiment, wherein sending a data structure containing the texts of the text nodes comprises sending the data structure in multiple segments.

A ninety-ninth embodiment is the computer program product of the ninety fifth embodiment, wherein the internal representation of the document is a document object model representation.

A one-hundredth embodiment is the computer program product of the ninety fifth embodiment, further operable to cause the data processing apparatus to perform operations comprising: receiving a notification that third text in a third text node is being replaced with new text in the original language; then sending a data structure containing the new text to the translation service, and replacing the text in the third text node with a corresponding third translated text in the second language received from the translation service to generate a third partially translated internal representation of the document; whereby a third partial translation of the markup language document is displayed by rendering the third partially translated internal representation.

A one-hundred-first embodiment is the computer program product of the one-hundredth embodiment, wherein the new text is generated by an executable script executing in the markup language display program.

A one hundred second embodiment is the computer program product of the ninety fifth embodiment, further operable to cause the data processing apparatus to perform operations comprising verifying that each text in a text node is unchanged before replacing the text with the corresponding translated text.

A one hundred third embodiment is the computer program product of the ninety fifth embodiment, further operable to cause the data processing apparatus to perform operations comprising: storing the original text corresponding to one or more text nodes; receiving input requesting display of the document in the original language; and replacing the texts in the text nodes in the first translated internal representation with the corresponding original texts, resulting in an original language internal representation; whereby a translation of the markup language document is displayed by rendering the first translated internal representation.

A one hundred fourth embodiment is a computer program product encoded on computer storage medium comprising instructions that when executed by a data processing apparatus cause the data processing apparatus to perform operations comprising: providing a translation service that receives text and generates a translation of the text; providing a translation module configured to run in a markup language display program, the markup language display program displaying a markup language document in an original language by rendering an internal representation of the document, the representation including nodes, the nodes including one or more text nodes and one or more non text nodes, the text nodes each including respective original text, the translation module configured to perform the following operations: while the markup language display program displays the document from the internal representation, sending a data structure containing the texts from the text nodes, as distinct data entities, to a translation service; replacing the texts in the text nodes with corresponding translated texts received from the translation service to generate a first translated internal representation of the markup language document, where the original texts in the text nodes are in the original language and the translated texts are in a different second language, and providing the first translated internal representation to the markup language display program for rendering.

A one hundred fifth embodiment is the computer program product of the one hundred fourth embodiment, wherein sending a data structure containing the texts of the text nodes comprises extracting the texts from the text nodes and assembling the extracted texts into the data structure, where each of the texts is stored as a distinct data entity in the data structure.

A one hundred sixth embodiment is the computer program product of the one hundred fourth embodiment, wherein sending a data structure containing the texts of the text nodes comprises sending a copy of the internal representation.

A one hundred seventh embodiment is the computer program product of the one hundred fourth embodiment, wherein sending a data structure containing the texts of the text nodes comprises sending the data structure in multiple segments.

A one hundred eighth embodiment is the computer program product of the one hundred fourth embodiment, wherein the internal representation of the document is a document object model representation.

A one hundred ninth embodiment is the computer program product of the one hundred fourth embodiment, wherein the translation module is further configured to perform the following operations: receiving a notification that first text in a first text node is being replaced with new text in the original language; then sending a data structure containing the new text to the translation service, and replacing the text in the first text node with a first translated text in the second language received from the translation service to generate a second translated internal representation of the document; and then providing the second translated internal representation to the markup language display program for rendering.

A one hundred tenth embodiment is the computer program product of the one hundred ninth embodiment, wherein the new text is generated by an executable script executing in the markup language display program.

A one hundred eleventh embodiment is the computer program product of the one hundred fourth embodiment, further comprising verifying that each original text is unchanged before replacing the original text with the corresponding translated text.

A one hundred twelfth embodiment is the computer program product of the one hundred fourth embodiment, further comprising: storing the original text corresponding to one or more text nodes; receiving input requesting display of the document in the original language; and replacing the texts in the text nodes in the first translated internal representation with the corresponding original texts, resulting in an original language internal representation; whereby a translation of the markup language document is displayed by rendering the first translated internal representation.

A one hundred thirteenth embodiment is a computer program product encoded on computer storage medium comprising instructions that when executed by a data processing apparatus cause the data processing apparatus to perform operations comprising: receiving a notification that a phrase comprising multiple words in a markup language document displayed in a user interface on a client device has been selected; requesting a translation of text corresponding to the selected phrase from a translation service on a server; and receiving a translation from the translation service and then displaying the translation in the user interface.

A one hundred fourteenth embodiment is the computer program product of the one hundred thirteenth embodiment, wherein the translation is displayed in a tooltip.

A one hundred fifteenth embodiment is a computer program product encoded on a computer readable storage medium comprising instructions that when executed by a data processing apparatus cause the data processing apparatus to perform operations comprising: storing original text corresponding to translated text in a translated markup language document, where the original text is in an original language and the translated text is in a different second language; displaying the translated markup language document in a user interface; receiving a notification that a phrase comprising multiple words in the translated text has been selected; and in response to the notification, displaying the original text corresponding to the selected phrase.

A one hundred sixteenth embodiment is the computer program product of the one hundred fifteenth embodiment, wherein the original text corresponding to the selected phrase is displayed in a tooltip.

What is claimed is:

1. A method, comprising:
    receiving a markup language document in an original language;
    generating an internal representation of the document, the representation including nodes, the nodes including one or more text nodes and one or more non-text nodes, the text nodes each including respective original text; and
    sending a data structure containing the texts from the text nodes, as distinct data entities, to a translation service and replacing the texts in the text nodes with corresponding translated texts received from the translation service to generate a first translated internal representation of the markup language document, wherein the original texts in the text nodes are in the original language and the translated texts are in a different second language;
    displaying a markup language document in the different second language by rendering the first translated internal representation of the document;
    determining that an executable script of the markup language document has replaced first text in a first text node with new text in the original language;
    in response to determining that the executable script of the markup language document has replaced first text in the first text node with new text in the original language, sending a data structure containing the new text to the translation service and receiving, from the translation service, first translated text for the first text node in the second language;
    replacing the text in the first text node with the first translated text in the second language to generate a second translated internal representation of the document; and
    displaying a markup language document in the different second language by rendering the second translated internal representation of the markup language document.

2. The method of claim 1, wherein sending a data structure containing the texts of the text nodes comprises extracting the texts from the text nodes and assembling the extracted texts into the data structure, where each of the texts is stored as a distinct data entity in the data structure.

3. The method of claim 1, wherein sending a data structure containing the texts of the text nodes comprises sending a copy of the internal representation.

4. The method of claim 1, wherein sending a data structure containing the texts of the text nodes comprises sending the data structure in multiple segments.

5. The method of claim 1, wherein the internal representation of the document is a document object model representation.

6. The method of claim 1, further comprising verifying that each original text is unchanged before replacing the original text with the corresponding translated text.

7. The method of claim 1, further comprising:
    storing the original text corresponding to one or more text nodes;
    receiving input requesting display of the document in the original language; and
    replacing the texts in the text nodes in the first translated internal representation with the corresponding original texts, resulting in an original language internal representation;
    whereby a translation of the markup language document is displayed by rendering the first translated internal representation.

8. A system, comprising: one or more computers operable to perform operations comprising:
    receiving a markup language document in an original language;
    generating an internal representation of the document, the representation including nodes, the nodes including one or more text nodes and one or more non-text nodes, the text nodes each including respective original text; and
    sending a data structure containing the texts from the text nodes, as distinct data entities, to a translation service and replacing the texts in the text nodes with corresponding translated texts received from the translation service to generate a first translated internal representation of the markup language document, wherein the original texts in the text nodes are in the original language and the translated texts are in a different second language;
    displaying a markup language document in the different second language by rendering the first translated internal representation of the document;

determining that an executable script of the markup language document has replaced first text in a first text node with new text in the original language;

in response to determining that the executable script of the markup language document has replaced first text in the first text node with new text in the original language, sending a data structure containing the new text to the translation service and receiving, from the translation service, first translated text for the first text node in the second language;

replacing the text in the first text node with the first translated text in the second language to generate a second translated internal representation of the document; and displaying a markup language document in the different second language by rendering the second translated internal representation of the markup language document.

9. The system of claim 8 further comprising a server device providing the translation service.

10. The system of claim 8, wherein the system comprises a client device running a markup language display program operable to perform the displaying a markup language document operation, and an add-in running in the markup language display program operable to perform the sending the data structure and replacing the texts in the text nodes operations.

11. The system of claim 10, wherein the add-in is a gadget.

12. The system of claim 10, wherein the add-in is a toolbar.

13. The system of claim 8, wherein the system comprises a client device running a web browser operable to perform the displaying a markup language document, sending the data structure, and replacing the texts in the text nodes operations.

14. The system of claim 8, wherein sending a data structure containing the texts of the text nodes comprises extracting the texts from the text nodes and assembling the extracted texts into the data structure, where each of the texts is stored as a distinct data entity in the data structure.

15. The system of claim 8, wherein sending a data structure containing the texts of the text nodes comprises sending a copy of the internal representation.

16. The system of claim 8, wherein sending a data structure containing the texts of the text nodes comprises sending the data structure in multiple segments.

17. The system of claim 8, further operable to perform operations comprising:

storing the original text corresponding to one or more text nodes;

receiving input requesting display of the document in the original language;

replacing the texts in the text nodes in the first translated internal representation with the corresponding original texts, resulting in an original language internal representation;

whereby a translation of the markup language document is displayed by rendering the first translated internal representation.

18. A computer-implemented method comprising:

receiving a markup language document in an original language;

generating an internal representation of the document, the representation including nodes, the nodes including one or more text nodes and one or more non-text nodes, the text nodes each including respective original text; and sending a data structure containing the texts from the text nodes, as distinct data entities, to a translation service;

receiving translated texts from the translation service to generate a first translated internal representation of the markup language document, wherein the original texts in the text nodes are in the original language and the translated texts are in a different second language;

determining that a first text node of the internal representation of the document in the original language was removed by an executable script of the markup language document after the data structure containing the texts was sent to the translation service;

in response to determining that a first text node of the internal representation of the document in the original language was removed by an executable script of the markup language document after the data structure containing the texts was sent to the translation service, removing the first text node from the translated internal representation of the markup language document;

displaying a markup language document in the different second language by rendering the translated internal representation of the markup language document.

19. The method of claim 18, wherein sending a data structure containing the texts of the text nodes comprises extracting the texts from the text nodes and assembling the extracted texts into the data structure, where each of the texts is stored as a distinct data entity in the data structure.

20. The method of claim 18, wherein sending a data structure containing the texts of the text nodes comprises sending a copy of the internal representation.

21. The method of claim 18, wherein sending a data structure containing the texts of the text nodes comprises sending the data structure in multiple segments.

22. The method of claim 18, wherein the internal representation of the document is a document object model representation.

23. The method of claim 18, further comprising verifying that each original text is unchanged before replacing the original text with the corresponding translated text.

24. The method of claim 18, further comprising:

storing the original text corresponding to one or more text nodes;

receiving input requesting display of the document in the original language; and replacing the texts in the text nodes in the first translated internal representation with the corresponding original texts, resulting in an original language internal representation;

whereby a translation of the markup language document is displayed by rendering the first translated internal representation.

25. A system comprising:

one or more computers and one or more storage devices storing instructions that are operable, when executed by the one or more computers, to cause the one or more computers to perform operations comprising:

receiving a markup language document in an original language;

generating an internal representation of the document, the representation including nodes, the nodes including one or more text nodes and one or more non-text nodes, the text nodes each including respective original text; and sending a data structure containing the texts from the text nodes, as distinct data entities, to a translation service;

receiving translated texts from the translation service to generate a first translated internal representation of the markup language document, wherein the original texts in the text nodes are in the original language and the translated texts are in a different second language;

determining that a first text node of the internal representation of the document in the original language was removed by an executable script of the markup language document after the data structure containing the texts was sent to the translation service;

in response to determining that a first text node of the internal representation of the document in the original language was removed by an executable script of the markup language document after the data structure containing the texts was sent to the translation service, removing the first text node from the translated internal representation of the markup language document;

displaying a markup language document in the different second language by rendering the translated internal representation of the markup language document.

26. The system of claim 25, wherein sending a data structure containing the texts of the text nodes comprises extracting the texts from the text nodes and assembling the extracted texts into the data structure, where each of the texts is stored as a distinct data entity in the data structure.

27. The system of claim 25, wherein sending a data structure containing the texts of the text nodes comprises sending a copy of the internal representation.

28. The system of claim 25, wherein sending a data structure containing the texts of the text nodes comprises sending the data structure in multiple segments.

29. The system of claim 25, wherein the internal representation of the document is a document object model representation.

30. The system of claim 25, wherein the operations further comprise verifying that each original text is unchanged before replacing the original text with the corresponding translated text.

31. The system of claim 25, wherein the operations further comprise:

storing the original text corresponding to one or more text nodes;

receiving input requesting display of the document in the original language; and replacing the texts in the text nodes in the first translated internal representation with the corresponding original texts, resulting in an original language internal representation;

whereby a translation of the markup language document is displayed by rendering the first translated internal representation.

32. A computer program product, encoded on one or more non-transitory computer storage media, comprising instructions that when executed by one or more computers cause the one or more computers to perform operations comprising:

receiving a markup language document in an original language;

generating an internal representation of the document, the representation including nodes, the nodes including one or more text nodes and one or more non-text nodes, the text nodes each including respective original text; and sending a data structure containing the texts from the text nodes, as distinct data entities, to a translation service;

receiving translated texts from the translation service to generate a first translated internal representation of the markup language document, wherein the original texts in the text nodes are in the original language and the translated texts are in a different second language;

determining that a first text node of the internal representation of the document in the original language was removed by an executable script of the markup language document after the data structure containing the texts was sent to the translation service;

in response to determining that a first text node of the internal representation of the document in the original language was removed by an executable script of the markup language document after the data structure containing the texts was sent to the translation service, removing the first text node from the translated internal representation of the markup language document;

displaying a markup language document in the different second language by rendering the translated internal representation of the markup language document.

33. A computer program product, encoded on one or more non-transitory computer storage media, comprising instructions that when executed by one or more computers cause the one or more computers to perform operations comprising:

receiving a markup language document in an original language;

generating an internal representation of the document, the representation including nodes, the nodes including one or more text nodes and one or more non-text nodes, the text nodes each including respective original text; and sending a data structure containing the texts from the text nodes, as distinct data entities, to a translation service and replacing the texts in the text nodes with corresponding translated texts received from the translation service to generate a first translated internal representation of the markup language document, wherein the original texts in the text nodes are in the original language and the translated texts are in a different second language;

displaying a markup language document in the different second language by rendering the first translated internal representation of the document;

determining that an executable script of the markup language document has replaced first text in a first text node with new text in the original language;

in response to determining that the executable script of the markup language document has replaced first text in the first text node with new text in the original language, sending a data structure containing the new text to the translation service and receiving, from the translation service, first translated text for the first text node in the second language;

replacing the text in the first text node with the first translated text in the second language to generate a second translated internal representation of the document; and displaying a markup language document in the different second language by rendering the second translated internal representation of the markup language document.

* * * * *